(12) United States Patent
Schwalbach et al.

(10) Patent No.: US 11,499,899 B2
(45) Date of Patent: Nov. 15, 2022

(54) WEAR COMPONENT OF A MILLING MACHINE, MILLING MACHINE, AND METHOD FOR DETERMINING THE WEAR ON THE WEAR COMPONENT

(71) Applicant: Wirtgen GmbH, Windhagen (DE)

(72) Inventors: Lothar Schwalbach, Asbach (DE); Matthias Brück, Siegburg (DE)

(73) Assignee: Wirtgen GmbH

( * ) Notice: Subject to any disclaimer, the term of this patent is extended or adjusted under 35 U.S.C. 154(b) by 736 days.

(21) Appl. No.: 16/450,437

(22) Filed: Jun. 24, 2019

(65) Prior Publication Data

US 2020/0003668 A1    Jan. 2, 2020

(30) Foreign Application Priority Data

Jul. 2, 2018    (DE) .................... 10 2018 115 959.5

(51) Int. Cl.
*G01N 3/56* (2006.01)
*E01C 23/088* (2006.01)
(52) U.S. Cl.
CPC ............. *G01N 3/56* (2013.01); *E01C 23/088* (2013.01)
(58) Field of Classification Search
CPC .......... G01N 3/56; G01N 27/02; G01N 27/24; E21C 23/088; E21C 23/065; E21C 25/10;
(Continued)

(56) References Cited

U.S. PATENT DOCUMENTS 6,879,632 B1    4/2005  Yokoyama
9,784,647 B2    10/2017 Sidles
(Continued)

FOREIGN PATENT DOCUMENTS

BE       899688 A1    9/1984
CN    104981570 A    10/2015
(Continued)

OTHER PUBLICATIONS

Roth et al., Quality and Inspection of Machining Operations: Tool Condition Monitoring, Aug. 2010, Journal of Manufacturing Science and Engineering, vol. 132, 16 pp. (Year: 2010).*

(Continued)

*Primary Examiner* — Toan M Le
(74) *Attorney, Agent, or Firm* — Gary L. Montle; Lucian Wayne Beavers; Patterson Intellectual Property Law, PC

(57) ABSTRACT

The invention relates to a wear component of a milling machine, to a milling machine equipped with such a wear component, and to a method for determining the wear on a wear component. The wear component has associated with it at least one contactlessly readable electronic component for determining the wear on the wear component. Provision is made according to the present invention that at least one sensor is connected to at least one contactlessly readable electronic component for the transfer of data; that the contactlessly readable electronic component is embodied to receive measured data of the sensor and furnish them for contactless reading; and that at least one measurement portion of the sensor is guided, along at least one wear direction to be monitored, into a wear region or along the wear region of the wear component. The invention makes possible a better milling result as a result of optimized maintenance.

24 Claims, 4 Drawing Sheets

(58) Field of Classification Search
CPC .......... E21C 35/18; E21C 47/00; E21C 19/02; E21B 1/00; E21B 12/02
See application file for complete search history.

(56) References Cited

U.S. PATENT DOCUMENTS

| | | | |
|---|---|---|---|
| 9,873,994 | B2 | 1/2018 | Wagner et al. |
| 9,890,504 | B2 | 2/2018 | Stock et al. |
| 10,385,938 | B2 | 8/2019 | Dohle et al. |
| 10,677,699 | B2 | 6/2020 | Marquez Llinas et al. |
| 10,787,776 | B2 | 9/2020 | Wagner et al. |
| 2015/0149027 | A1 | 5/2015 | Paulsen et al. |
| 2017/0011564 | A1 | 1/2017 | Marsolek et al. |
| 2018/0171568 | A1* | 6/2018 | Laclef .................... E21C 35/18 |
| 2020/0003668 | A1 | 1/2020 | Schwalbach et al. |

FOREIGN PATENT DOCUMENTS

| | | |
|---|---|---|
| CN | 106932292 A | 7/2017 |
| CN | 107041134 A | 8/2017 |
| CN | 107849836 A | 3/2018 |
| CN | 210737314 U | 6/2020 |
| DE | 3317800 A1 | 11/1984 |
| DE | 4415824 C1 | 11/1995 |
| DE | 102005016346 B3 | 1/2007 |
| DE | 102008045470 A1 | 3/2010 |
| DE | 102014104741 A1 | 10/2015 |
| DE | 102014112868 B3 | 3/2016 |
| JP | 03259702 A | 11/1991 |

OTHER PUBLICATIONS

China Search Report for corresponding patent application No. 20191057412, dated Feb. 2, 2021, 3 pages.
China Office Action for corresponding patent application No. 201910571541.2, dated Feb. 10, 2021, 7 pages.
European Patent Office Search Report for corresponding patent application No. 19181356.7, dated Nov. 19, 2019, 7 pages.

* cited by examiner

WEAR COMPONENT OF A MILLING MACHINE, MILLING MACHINE, AND METHOD FOR DETERMINING THE WEAR ON THE WEAR COMPONENT

CROSS-REFERENCES TO RELATED APPLICATIONS

This application claims benefit of German Patent Application No. 10 2018 115 959.5, filed Jul. 2, 2018, and which is hereby incorporated by reference.

FIELD OF THE INVENTION

The invention relates to a wear component of a milling machine, in particular of a road milling machine, a stabilizer, a recycler, a surface miner, or the like, the wear component having associated with it at least one contactlessly readable electronic component for determining the wear on the wear component.

The invention also relates to a milling machine, in particular to a road milling machine, a stabilizer, a recycler, a surface miner, or the like, the milling machine comprising wear components, in particular bits, bit holders, base carriers of a tool system, ejectors, and/or wear runners.

The invention also relates to a method for determining the wear on a wear component of a milling machine, in particular of a road milling machine, a stabilizer, a recycler, a surface miner, or the like; the wear component having associated with it at least one contactlessly readable electronic component; data of the at least one contactlessly readable electronic component being contactlessly readable by a reading device; and the wear on the wear component being determined based on the read-out data.

BACKGROUND

US 2017 0011564 A1 discloses a monitoring system for bits of a milling drum. At least one transmitter, for example in the form of an RFID transmitter, is associated with each bit. The transmitter is in radio connection with a receiver arranged on the milling machine, and via that with an evaluation system. On the basis of the signal of a transmitter, the evaluation system recognizes the loss of, or impermissible wear on, a bit. The system infers loss or impermissible wear if one or several signals of one or several transmitters fail. If two or more transmitters are associated with a bit, loss or breakage of the bit is then inferred if the signals of all the transmitters associated with the bit are absent. If the signal of one transmitter fails and the signal of a second transmitter associated with the bit continues to be received, it is inferred that a wear limit has been reached. In accordance with a variant embodiment that is described, the operating time of the bits—from installation to failure of one or several transmitters—is detected and is used, for example in combination with further operating parameters of the milling machines, to determine a life expectancy of the bits or to schedule more-efficient operating conditions for future milling tasks.

Disadvantageously, the monitoring system does not recognize the wear on a bit until a wear limit is reached. This gives a machine operator little opportunity to place an upcoming replacement of the bit in a favorable maintenance time period, for example a scheduled stoppage of the milling machine, and thereby to avoid additional stoppage times. A further disadvantage arises from the fact that the transmitter must be arranged in such a way that it can be evaluated by way of corresponding radio signals. In the context of metallic bits, which therefore shield electromagnetic waves, this is possible only with transmitters installed close to the surface. A transmitter installed in the region of a wear limit of a bit cannot be read, or at least cannot be read over a longer distance.

DE 10 2014 104 741 A1 discloses an RFID sensor tag that comprises a plug connector by way of which various sensors can be connected to the RFID sensor tag. The (preferably analog) sensor signals can be digitized by way of an A/D converter and stored in a data memory. The measured value transferred from the sensor can be an electrical resistance. The measured data can be transferred to an RFID reading device.

BRIEF SUMMARY

An object of the present invention is to create a wear component of a milling machine, or a milling machine, which makes possible cost-effective operation and a better milling result as a result of optimized maintenance.

A further object of the invention is to furnish a method that makes possible cost-effective operation of the milling machine.

That object of the invention which relates to the wear component is achieved by the fact that at least one sensor is connected to at least one contactlessly readable electronic component for the transfer of data; that the contactlessly readable electronic component is embodied to receive measured data of the sensor and furnish them for contactless reading; and that at least one measurement portion of the sensor is guided, along at least one wear direction to be monitored, into a wear region or along the wear region of the wear component. The sensor encompasses at least the measurement portion and preferably an associated electronic system (measurement circuit) in order to detect a physical variable of the measurement portion and convert it into a measurement signal dependent on the physical variable. The measurement portion is designed in such a way that the physical variable changes with a change in the length of the wear region along the wear direction. As wear on the wear region proceeds along the wear direction, the value of the physical variable, and thus of the measurement signal, changes. The measured data transferred to the contactlessly readable electronic component can be constituted by the measurement signal. It is also possible, however, for a conversion of the measurement signal, for example from an analog to a digital form, to occur within the sensor, so that correspondingly digitized measured data are directed from the sensor to the contactlessly readable electronic component. The measured data are received by the contactlessly readable electronic component and furnished for contactless reading.

Advantageously, the sensor allows determination of the remaining length of the wear region along the wear direction, and thus of the present wear state of the wear component. The corresponding measured data can be read out via the contactlessly readable electronic component and evaluated. It is thus possible to access, at any time, an up-to-date indication regarding the wear state of the wear component, thereby enabling predictive scheduling of maintenance work, for example an imminent replacement of the wear component. Additional stoppage times of the milling machine, for example in the event that the wear component unexpectedly reaches a wear limit, can be avoided. Different wear components of the milling machine which are approaching their respective wear limits can be replaced in one maintenance interval. Wear components having less wear are recognized and can continue to be used. Cost-effective operation of the milling machine is thereby enabled. The wear components are not used beyond their respective wear limits, so that a high milling quality is maintained. They are also not replaced prematurely, however, so that costs for replacement parts are minimized.

Advantageously, only the measurement portion of the sensor is guided in the wear region. The contactlessly readable electronic component can be arranged in a region that enables contactless reading of the measured data even over longer distances. The distance over which the measured data can be read out is preferably equal to at least 10 mm, particularly preferably at least 20 mm.

In accordance with a particular embodiment of the invention, provision can be made that abrasion of the measurement portion results in a continuous or discontinuous change in a measurement signal of the sensor. The measurement portion guided in the wear region of the wear component becomes worn away together with the wear component, resulting in a change in the value of the physical variable ascertained at the measurement portion, and thus of the measurement signal. A measurement signal that changes continuously as wear on the wear component proceeds makes possible a continuous determination of a wear length constituting a magnitude between a wear limit and a surface of the wear component along the wear direction, and thus a continuous determination of the wear state of the wear component. A measurement signal that changes discontinuously as a result of abrasion is simple to evaluate, for example because no calibration of the sensor needs to occur and only the number of changes in the measurement signal needs to be evaluated in order to determine the remaining wear length. The distances along the wear direction which result in a change in the measurement signal are to be selected to be sufficiently small that a desired accuracy in terms of determining the remaining wear length is achieved.

Provision can preferably be made that the sensor or a part of the sensor, in particular a measurement circuit of the sensor, is an integral constituent of the contactlessly readable electronic component; or that the sensor is electrically connected to the contactlessly readable electronic component detachably, preferably via a plug connection; or that the sensor is connected to the contactlessly readable electronic component via a fixed electrical connection; or that the sensor is connected to the contactlessly readable electronic component via a radio connection. Integration of the sensor, or of a part of the sensor, into the contactlessly readable electronic component results in a simple, inexpensive, and robust construction, for example because a shared housing can be used, no external and therefore failure-prone electrical interfaces need to be provided between the sensor and the contactlessly readable electronic component, and the contactlessly readable electronic component and the sensor can be installed as an integral constituent in one working step. A detachable connection between the sensor and the contactlessly readable electronic component makes it possible to install the sensor and the contactlessly readable electronic component at different locations. The sensor can thereby be arranged in such a way that its measurement portion is guided into or along the wear region of the wear component, while the contactlessly readable electronic component can be arranged at a position that enables simple contactless reading over a sufficiently long distance. Coupling via a plug connection ensures simple installation. As a result of the separate embodiment of the sensor and of the contactlessly readable electronic component, they can be embodied optimally in terms of their shape, robustness, and function, and need to be coordinated with one another only at their interface. Available sensors and contactlessly readable electronic components which are equipped with corresponding interfaces can also be combined. Advantageously, the contactlessly readable electronic component can be designed in such a way that it can be combined with various sensors. Different sensors can thus be connected to the same contactlessly readable electronic component. It is thus conceivable to provide, for different wear components having e.g. wear regions of different sizes, sensors having different measurement regions, which are then connected to the same contactlessly readable electronic components. The result is a modular system having sensors adapted to the particular application and having uniform contactlessly readable electronic components. The latter can be read out, for example, using identical reading devices or using the same reading device. It is conceivable for the plug connection to be established upon installation of the wear component on the milling machine, in one installation motion.

With a detachable connection or a radio connection between the contactlessly readable electronic component and the sensor, the possibility also exists of reusing the contactlessly readable electronic component (after wear on the wear component and thus at least on the measurement portion of the sensor) on a further wear component having a new sensor.

A permanent wire-based connection between the sensor and the contactlessly readable electronic component ensures an undisrupted electrical contact even in austere environmental conditions so that, for example elevated contact resistance values due to corrosion cannot distort the measured data transferred from the sensor to the contactlessly readable electronic component. A radio connection between the sensor and the contactlessly readable electronic component makes it possible to arrange them at different locations with no need to install a wire-based connection between them.

Particularly preferably, provision can be made that the contactlessly readable electronic component or components are constituted by RFID transponders. RFID transponders enable contactless exchange of data with an associated reading device. They are obtainable commercially in large numbers and therefore inexpensively. RFID transponders can already comprise an interface, which makes possible simple attachment of sensors.

Provision can preferably be made that the RFID transponder is a passive RFID transponder or an active RFID transponder or a semi-active RFID transponder. Passive RFID transponders advantageously need no built-in energy source, and are correspondingly inexpensive and maintenance-free. They are small, easy to install, and require little installation space. In addition, passive RFID transponders can easily be installed. In order to read out the data stored in a passive RFID transponder, it is supplied with energy via the electromagnetic waves of the reading device being used. Active RFID transponders possess a built-in energy source, in particular a built-in battery. They comprise a built-in transmitter and thus advantageously have a longer range as compared with passive RFID transponders. Semi-active RFID transponders likewise possess a built-in battery that serves to supply energy to the microchip used in the RFID transponder. They do not possess a transmitter, however, and are read out simply by reflection of the electromagnetic field emitted from the reading device.

If provision is made that the sensor is supplied with energy by a primary battery or rechargeable battery of the contactlessly readable electronic component or via the energy of the electromagnetic field used to read out the contactlessly readable component, a built-in energy source is not required for the sensor. The wear component having the installed sensor can be stored for a long period of time before use, with no discharge of an energy source of the sensor. It is not necessary to check the charge state of an energy source of the sensor upon installation of the wear component or after a long period of use.

A sensor that measures the remaining wear region in simple and discontinuous fashion can be constituted by the fact that the measurement portion of the sensor is constituted by two or more electrical resistors, connected in parallel with one another and arranged with a spacing from one another along the wear direction that is to be monitored. What is measured is the total resistance of the electrical resistors connected in parallel. If one of the resistors also becomes worn away during abrasion of the wear component, the total resistance then abruptly rises. That change in resistance can easily be detected instrumentally, and the remaining wear length can be determined based on the known position of the resistor that was worn away. According to one possible evaluation mode, the remaining wear length can be determined directly from the measured total resistance. This requires an accurate knowledge of the total resistance as a function of the number of remaining resistors, as well as sufficiently accurate instrumentation. According to an alternative evaluation mode, the number of measured changes in resistance, and thus the number of resistors worn away, can also be determined, and the remaining wear length of the wear component along the wear direction can be inferred therefrom. Advantageously, this requires no calibration of the sensor, since only changes in resistance need to be identified, and an exact resistance measurement is not necessary.

Instrumentally simple continuous determination of the wear length can be achieved by the fact that the measurement portion of the sensor is constituted by a resistance element; and that the resistance of the resistance element changes as a result of abrasion of the resistance element. The resistance element can be constituted, for example, by a resistance material, contacted on both sides, having a longitudinal extent that proceeds transversely to the current direction of a measurement current, which element is guided along its longitudinal extent in a wear direction into or along the wear region of the wear component. The resistance material then becomes worn away along its longitudinal extent together with the wear component, with the result that the resistance of the resistance element changes. The remaining wear length is inferred based on the measured resistance of the resistance element.

Simple and inexpensive determination of the wear length can be achieved by the fact that the measurement portion of the sensor is constituted by a capacitive sensing element or by an inductive sensing element; and that the capacitance of the capacitive sensing element or the inductance of the inductive sensing element changes as a result of abrasion of the sensing element. It is also conceivable for the measurement portion to be constituted by an optical waveguide, for example a glass fiber or a bundle of glass fibers. Abrasion of the optical waveguide thus causes a change in the optical path length for a beam guided in the optical waveguide. This can be identified, for example, interferometrically or via a transit-time measurement.

Provision can preferably be made that the measurement portion of the sensor is constituted at least in portions by the wear region of the wear component or by at least a portion of the wear region of the wear component. Abrasion of the wear region then directly produces a change in the measurement signal of the sensor.

Provision can be made for that purpose that the measurement signal of the sensor is constituted by an electrical resistance of the wear component or of a portion of the wear component; or that the measurement signal of the sensor is constituted by a capacitance measured between an electrode and the wear component or a portion of the wear component; or that the measurement signal is constituted by an inductance of a coil in whose magnetic field the wear component or a portion of the wear component is guided. If the wear component or a portion of the wear component constitutes an electrical resistance of the sensor, that resistance rises upon abrasion of the wear component; this can be detected instrumentally in simple fashion and with no interference. In the context of a capacitive measurement portion, the wear component or the portion of the wear component constitutes the required second electrode of the sensing element. Wear on the wear component causes a change in the capacitance of the capacitive sensing element constituted by the wear component and the further electrode, from which the remaining wear length can be inferred. In the case of an inductive sensor the wear region, or a portion of the wear region, can constitute the core of a coil of the inductive sensing element. Erosion thereof has a detectable effect on the inductance of the coil.

Simple positioning of the measurement portion within the wear region can be made possible by the fact that the measurement portion of the sensor is arranged within at least one recess in the wear region of the wear component.

In accordance with an embodiment of the invention, provision can be made that the wear component to be monitored is a bit, a bit holder, a base carrier of a tool system, an ejector, and/or a wear runner of the milling machine. Bits are subject to severe wear during milling operations, and must be replaced correspondingly often. Correctly timed replacement is advantageous in terms of avoiding damage to a bit holder or to a milling drum on which the bit is held. On the other hand, in order to minimize costs for replacement bits and for milling machine stoppage times, a bit should be not be replaced until its wear limit has been reached. Ongoing wear on a bit holder or base carrier of a tool system with which a bit is secured on a milling drum can result in loss of the bit. This can be avoided by correctly timed replacement of the bit holder or base carrier. Ejectors and wear runners require less-frequent replacement compared with the bits. By determining the remaining wear lengths of the wear components recited, it is possible to synchronize the replacement intervals (having different lengths) so that milling machine stoppage times can be minimized.

The wear length of the wear region is measured by way of the sensor and its measurement portion. The measurement portion is therefore deliberately positioned in a portion of the wear component subject to severe mechanical wear. In order to protect the contactlessly readable electronic component, which is responsible for data transfer, from damage, provision can be made that the at least one contactlessly readable electronic component is arranged outside the wear region of the wear component, preferably in a region of the wear component which is protected from wear, particularly preferably in a recess within the wear component.

An object of the invention is also achieved with a milling machine that comprises at least one wear component, the milling machine having associated with it at least one reading device for contactlessly reading out measured data of the sensor which are stored in the contactlessly readable electronic component or components. The measured data can be delivered from the reading device, for example, to a higher-order machine control system of the milling machine for further use. Advantageously, the reading device can be embodied to read out the measured data of several contactlessly readable electronic components arranged on one or several wear components; or several reading devices, each of which reads out one or several contactlessly readable electronic components, can be arranged on the milling machine. The contactlessly readable electronic components can each be connected to one or to several sensors. It is thus possible to ascertain the wear state for one or for several wear components, and to schedule maintenance work involving a possible replacement of the wear component or components. It is thereby possible to avoid both premature and excessively delayed replacement of wear components, with the result that cost-effective operation of the milling machine is achieved while maintaining high milling quality.

One particular variant of the invention is such that the sensor or the contactlessly readable electronic component or the reading device or a control unit connected to the reading device is embodied to determine, as a measure of the wear on the wear component, a wear length, measured along the wear direction to be monitored, between a reference point, in particular a wear limit of the wear component, and a wearing surface of the wear component. The wear length indicates a distance, and thus a remaining material thickness, between the reference point and the wearing surface. If the reference point is the wear limit the attainment of which marks a borderline degree of wear on the wear component, the wear length then corresponds to the remaining material thickness until that wear limit is reached. A possible milling output that can be achieved with the wear component until replacement is required can be estimated, for example, based on the wear length.

An exact determination of the wear length can be made by the fact that the contactlessly readable electronic component or the reading device or the control unit is embodied to determine the wear length as a function of the measured data of the at least one sensor.

Particularly preferably, provision can be made that the reading device is an RFID reading device. The contactlessly readable electronic component is then to be embodied as an RFID transponder. RFID reading devices and RFID transponders optimized for many applications are available commercially in large quantities, and can therefore be provided for utilization according to the present invention inexpensively and with no or only minor modifications.

That object of the invention which relates to the method is achieved by the fact that a wear length of the wear component along a wear direction to be monitored, constituting a distance between a reference point, in particular a wear limit of the wear component, and a wearing surface of the wear component, or a magnitude correlating with the wear length, is ascertained and is contactlessly read out. The wear length characterizes the wear state of the wear component. If the selected reference point corresponds to the wear limit of the wear component, the wear length then describes the wear thickness remaining between the wear limit and the wearing surface. This makes possible a prognosis regarding the remaining service life of the wear component, and thereby appreciably improves the ability to schedule maintenance tasks. Advantageously, wear components can be used until their wear limit is reached, and exceedance of the wear limit can be reliably avoided. Cost-effective operation of the milling machine, together with high milling quality, is thereby achieved. Maintenance intervals for various wear components can be coordinated, so that stoppage times for the milling machine are minimized. Contactless reading makes possible simple transfer of the ascertained wear lengths, or of the magnitude describing the wear length, for example to a downstream machine control system of the milling machine. This is the case especially because the wear components are for the most part moving components for which wire-based contacting would be difficult or impossible to achieve.

Particularly advantageously, provision can be made that, using a sensor, the wear length or a magnitude correlating with the wear length is determined and is conveyed to the at least one contactlessly readable electronic component. The sensor can be embodied in optimized fashion for the desired measurement task, namely determination of the wear lengths. The contactlessly readable electronic component is designed for communication with an associated reading device. The measured data ascertained by the sensor are transferred from the sensor to the contactlessly readable electronic component and from that to a suitable reading device. Advantageously, the sensor can be arranged in the severely mechanically stressed wear region of the wear component, while the contactlessly readable electronic component can be positioned in a region that is protected from wear. The placement of the contactlessly readable electronic component is preferably selected so as to ensure an interference-free radio-based connection to an associated reading device over a sufficiently long distance.

According to a variant of the invention, provision can be made that a measurement portion of the sensor is also worn away as wear on the wear component proceeds, with the result that a measurement signal of the sensor changes; and that the wear length is determined from the measurement signal; or that the measurement signal constitutes the magnitude correlating with the wear length. The dimensions of the measurement portion change together with those of the wear component. The accompanying change in the measurement signal correlates with the change in the length of the measurement portion, and thus with the change in the wear lengths. The wear length can thus be inferred directly from the measurement signal.

Provision can preferably be made that the sensor determines a resistance of electrical resistors that are connected in parallel with one another and are arranged with a spacing from one another along the wear direction that is to be monitored; or that the sensor determines a resistance of an electrical resistance element extending in a wear direction and that the wear length is ascertained as a function of the determined resistance; or that the determined resistance is the magnitude correlating with the wear length. The electrical resistors or the resistance element are guided in the wear region of the wear component and are worn away along with it by abrasion. In a context of multiple electrical resistors arranged along the wear direction, they are worn away successively in accordance with the ongoing abrasion of the wear component. The resistance, measured over all the resistors connected in parallel, changes abruptly with each destruction of one of the resistors. The present wear area can be inferred based on the resistance measured with the sensor, or on the number of changes in the measured resistance. If an electrical resistance element, preferably contacted on both sides, extends in a wear direction into the wear region, it becomes continuously worn away along with the wear component by abrasion. This results in a likewise continuous increase in the resistance measured at the resistance element, from which the remaining wear length can then be inferred. Electrical resistors or resistance elements, constituting a measurement portion of the sensor, are available inexpensively. An electrical resistance measurement can be carried out in simple fashion and with no, or at least little, interference.

An electrical measurement of a value of a physical property of a measurement portion of the sensor, which value changes with the remaining wear length of the wear component, can be made possible by the fact that the sensor is supplied with energy via a primary battery or via a rechargeable battery or via an electromagnetic field used to read out the contactlessly readable component. Advantageously, the sensor and the contactlessly readable electronic component use the same energy source.

If provision is made that the wear length, or the magnitude correlating with the wear length, is temporarily stored by the contactlessly readable electronic component and is read out contactlessly by the reading device, the measured data of the sensor can then be transmitted at any time to the contactlessly readable electronic component and stored. The measured data can be read out by the reading device in delayed fashion, for example, if the contactlessly readable electronic component is located inside a transmitting or receiving region of the reading device.

Provision can preferably be made that the wear length of a wear component, or the wear lengths of several wear components, are displayed by a display unit; and/or that as a function of the wear length of a wear component, or the wear lengths of several wear components, suitable machine parameters for operating the milling machine are displayed or defined by the display unit; and/or that as a function of the wear length of a wear component, or the wear lengths of several wear components, milling tasks executable using the milling machine without replacement of the wear component or components, or the quality achievable upon execution of various milling tasks without replacement of the wear component or components, are displayed by the display unit. If the wear length of one or several wear components is displayed by the display unit, a machine operator can then decide whether replacement of one or several wear components is imminent. Advantageously, suggestions for suitable operation of the milling machine using the existing wear components are also provided to the machine operator. In addition to the ascertained wear lengths, further parameters can be taken into account, for example a substrate to be worked, a required milling quality, and the like. The ascertained machine parameters, for example an advance rate, a milling drum rotation speed, a milling depth, and the like, can be displayed to the machine operator and established by him or her. Provision can also be made, however, that at least individual machine parameters are adapted automatically, i.e. without action by a machine operator, as a function of the ascertained wear lengths. In a context of more-heavily worn bits, it can be the case that higher-precision milling tasks can no longer be carried out, or at least can no longer be carried out with the desired quality. The bits continue to be suitable for coarser milling work, however. Advantageously, the milling tasks that can still be carried out with the existing bits, or the quality that can still be achieved with the existing bits, can be displayed to a machine operator.

Wear components used at different positions on the milling machine can wear at different rates. It can therefore happen that, for example, bits are exposed to different stresses, and therefore differing abrasion, depending on their position on a milling drum. In order to obtain a milling pattern that is as uniform as possible, it is advantageous if the bits arranged on a milling drum exhibit approximately the same wear state, i.e. if there are no borderline-worn bits located in one region of the milling drum and appreciably less-worn bits at another location. The same is also true for other wear components of the milling machine, for example the bit holders. In order to enable uniform wearing of wear parts, provision can therefore be made that depending on the ascertained wear length of identical wear components used at different positions on the milling machine, a mutual exchange of the wear components is suggested and/or displayed. Wear components previously arranged in a lower-stress region can thus be shifted into a higher-stress region, and vice versa. The wear state of the wear components is thereby equalized to a predefined extent despite differences in stress.

In accordance with a particular variant embodiment of the invention, provision can be made that the reading device is arranged on a tool used for installation and/or deinstallation of a bit; and that the wear length, or the magnitude correlating with the wear length, is read out contactlessly by the reading device upon replacement of a bit. Upon replacement of a bit it is thus possible, for example, to monitor the wear state of the associated bit holder or of a base carrier in which the bit holder is held. In this context, the tool and thus the reading device are brought into immediate proximity with the bit holder or base carrier having the contactlessly readable electronic component arranged thereon. This immediate proximity between the reading device and the contactlessly readable electronic component enables contactless data exchange even in the vicinity of large metallic wear components that produce considerable electromagnetic shielding.

BRIEF DESCRIPTION OF THE SEVERAL VIEWS OF THE DRAWINGS

The invention will be explained in further detail below with reference to an exemplifying embodiment depicted in the drawings, in which.

DETAILED DESCRIPTION

Figure 1:
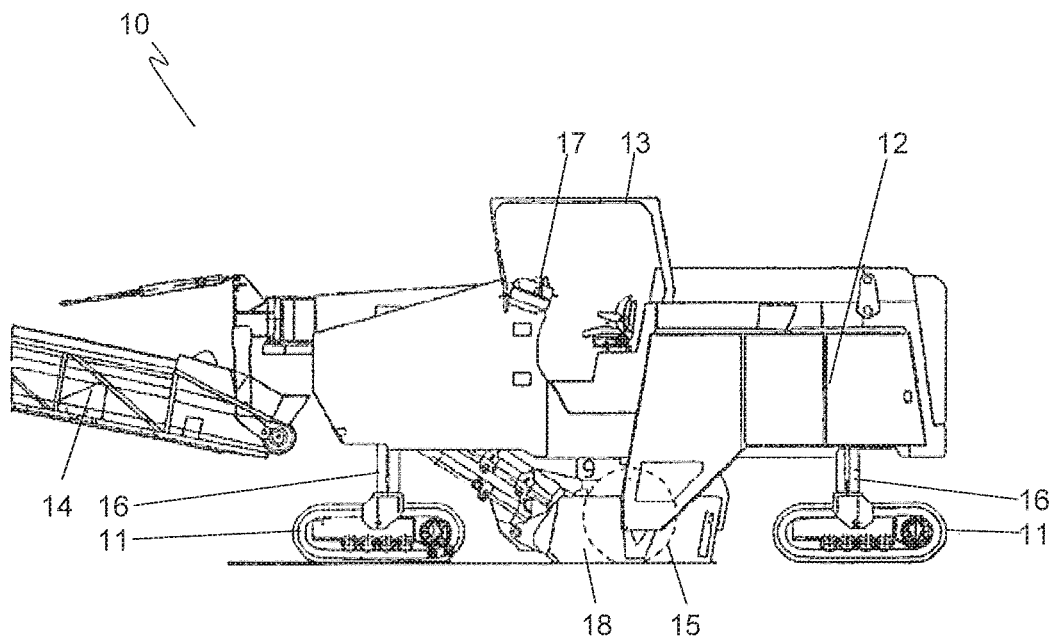
FIG. 1 is a schematic side view depicting a milling machine.

FIG. 1 is a schematic side view depicting a milling machine 10, in the present case a road milling machine. The invention can also be provided on other types of milling machines for working substrates, for example on stabilizers, recyclers, surface miners, and the like. A machine frame 12 is carried, vertically adjustably via four lifting columns 16, by travel units 11, for example crawler track units. Milling machine 10 can be operated by way of an operating console 17 arranged in an operating cabin 13. A milling drum 15, shown schematically with dashed lines in the illustration and arranged in concealed fashion, is rotatably mounted in a milling drum housing. Provided alongside milling drum 15 are oppositely located side panels 18 constituting edge protectors, which are in contact with the surface to be removed. They prevent the milled material from emerging to the side, and prevent rough broken edges at the boundary of the milled region. Wear elements (not depicted) are replaceably fastened at those edges of side panels 18 which face toward the substrate. A conveying device 14 serves to carry away the milled material.

Figure 2:
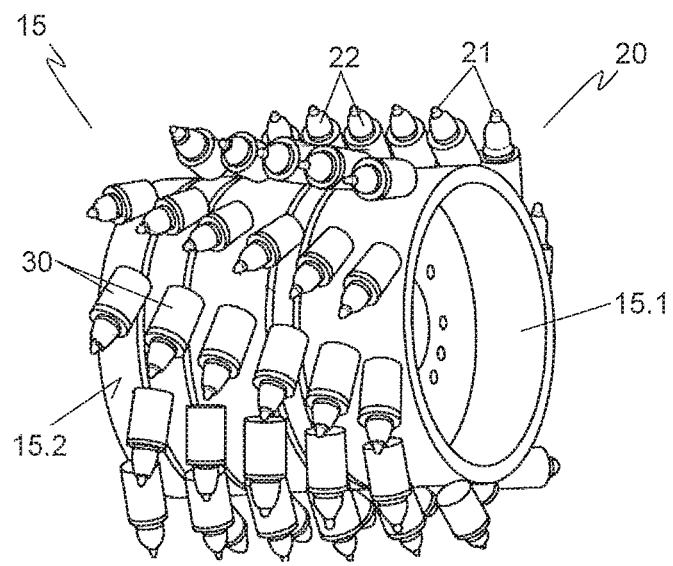
FIG. 2 is a schematic perspective depiction of a milling drum having bits arranged thereon.

FIG. 2 is a schematic perspective depiction of a milling drum 15 having bits 20 arranged thereon. In the variant configuration of milling drum 15 which is shown, bits 20 are held replaceably in bit holders 30. Bit holders 30 themselves are fixedly connected, in rows proceeding obliquely to the rotation direction of milling drum 15, to a drum surface 15.2 of a milling drum tube 15.1 of milling drum 15. Bit holders 30 are preferably welded to milling drum tube 15.1. From each bit 20, a respective bit head 22 having a bit tip 21 arranged at the end thereof projects out of bit holder 30. Bit heads 22 and bit tips 21 arranged thereon are oriented with an oblique tilt toward the rotation direction of milling drum 15.

Different milling drums 15, having different arrangements of bit holders 30 and having types of bit holders 30 and/or bits adapted to the particular milling task, are used depending on the milling task to be carried out.

Milling machine 10 is moved during use, at an advance speed inputted via operating console 17, over the substrate to be worked. A motor drives milling drum 15 at an adjustable rotation speed. As a result, bits 20 arranged on the rotating milling drum 15 remove the substrate, for example a road surface. Lifting columns 16 allow frame 12 to be vertically displaced, and thus permit the milling depth to be adjusted. Alternatively or additionally, milling drum 15 can be vertically displaceable relative to machine frame 12. The advance speed, the milling depth, and the actual milling width ultimately determine the working output of the road milling machine, i.e. for example a distance or area or mass removed per unit time, or a removed volume.

Bits 20 are subject to severe wear and must therefore be regularly replaced. Their service life depends on the material properties of the substrate being worked, and on the machine parameters with which milling machine 10 and thus milling drum 15 are operated.

In order to replace bits 20 they can be detached from tool holders 30, preferably using a suitable tool, and new bits 20 can be inserted into bit holders 30.

Bit holders 30 are also in contact with the substrate that is to be removed, and experience wear. Bit holders 30 furthermore experience wear in particular at the contact surface at which bits 20 brace against bit holders 30, so that they must occasionally be replaced. The service lives of bit holders 30 are longer than those of bits 20 contained therein. Further wear components, for example wear elements arranged on side panels 18, have even longer services lives but must nevertheless be replaced when a wear limit is reached.

If bits 20 are used for too long, so that they become worn down beyond their wear limit, this can result in increased wear on the respective bit holders 30. Milling quality and milling output also decrease when worn-out bits 20 are used. If bit holders 30 are too greatly worn, there is a risk that bits 20 will be lost. Irregularly worn bit holders 30 cause the quality of the milling result to deteriorate.

Premature replacement of wear components, conversely, results in elevated costs as well as excessively short maintenance intervals and therefore long stoppage times for milling machine 10.

Figure 3:
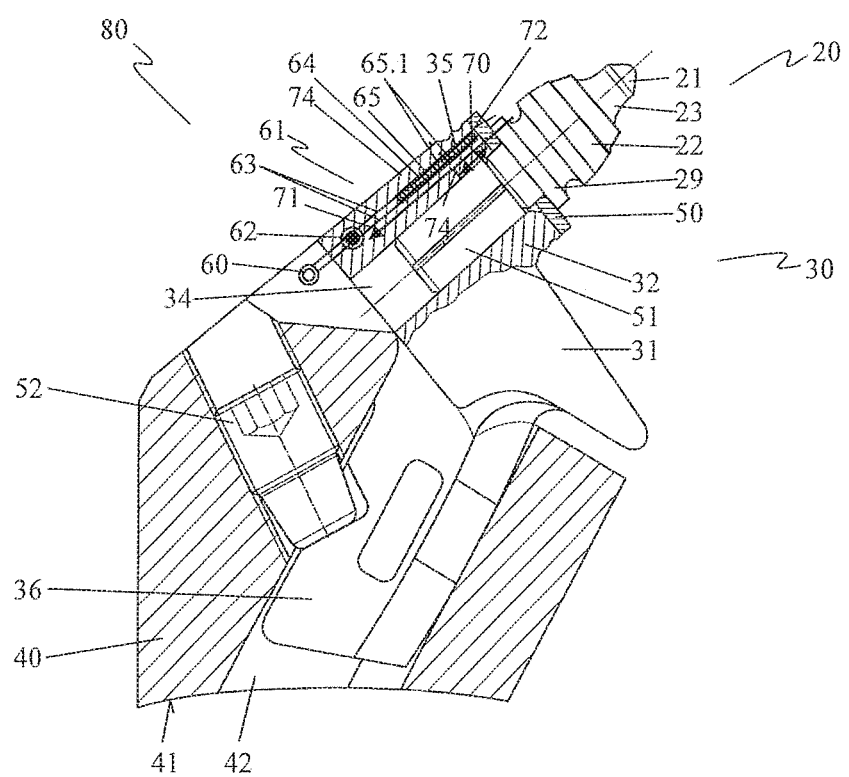
FIG. 3 shows a tool system having a bit, a bit holder, a base carrier, and a schematically depicted measurement portion of a respective sensor introduced into a wear region of the bit holder and into a wear region of the base carrier.

FIG. 3 shows a tool system 80 having a bit 20, a bit holder 30, a base carrier 40, and a schematically depicted measurement portion 64 of a sensor 61 introduced into a wear region 70 of the bit holder 30.

Bit 20 can be embodied as a round-shank bit having a bit head 22 and a bit shank 26. In the region of its bit shank 26, bit 20 carries a clamping sleeve 51. Clamping sleeve 51 is freely rotatable on bit shank 26 in a circumferential direction of bit shank 26, but is held captively in an axial direction. By means of clamping sleeve 51, bit 20 can be held clamped in a bit receptacle 34 of bit holder 30. As FIG. 3 shows, bit head 22 comprises a bit tip 21 having a connecting part 23. Bit tip 21 is made of a hard material, preferably a metal carbide. Bit tip 21 is fastened by means of connecting part 23 onto bit head 22, preferably soldered to it.

Bit 20 can be equipped (not depicted) with a second sensor 61 and with a second RFID transponder 60, as described with reference to FIGS. 4 and 5.

Bit holder 30 comprises a supporting body 31 on which a holding portion 32 is shaped, facing toward bit 20. Holding portion 32 can be embodied, for example, cylindrically and can be penetrated by bit receptacle 34. A wear disk 50, through whose central orifice bit shank 26 of bit 20 is guided to bit receptacle 34, can be provided on that end face of holding portion 32 which faces toward bit head 22. Oppositely, bit 20 braces with collar 29 against wear disk 50. That end face of holding portion 32 which faces toward wear disk 50 exhibits the greatest wear on bit holder 30. As a result of the rotation and pressure of bit 20 which are transferred via wear disk 50 to the front surface of holding portion 32, holding portion 32 becomes worn down starting from the front surface.

An insertion projection 36 can be shaped onto supporting body 31, facing away from bit 20. Insertion projection 36 is introduced into an insertion receptacle 42 of a base carrier 40 and held there, for example, with a compression bolt 52. Bit holder 30 is thereby fastened detachably on base carrier 40.

Base carrier 40 is installed with a lower attachment side 41 connected, preferably welded, to milling drum tube 15.1 shown in FIG. 2.

In addition to bit 20, bit holder 30 and base carrier 40 also represent wear components of milling machine 10. During ordinary operation of milling machine 10, bit holder 30 has a longer service life than bit 20, and base carrier 40 has a longer service life than bit holder 30.

The wear on bit holder 30 and/or on base carrier 40 can be detected using at least one respective sensor 61, as shown in the present case for bit holder 30. The measured data obtained are transferred to a corresponding reading device with the aid of a contactlessly readable electronic component, in the present case an RFID transponder 60. The reading device can be constituted from an antenna and an associated electronic system. The antenna and the electronic system can be present as a physical unit or in separately embodied fashion.

In order to monitor the wear state of bit holder 30, a recess 35 is provided in its holding portion 32. Recess 35 can be embodied, for example, in the form of an orifice and can proceed, along its longitudinal extent, in the direction of the center axis of bit receptacle 34 that is arranged with an offset thereto. It is oriented with its one end toward that end face of holding portion 32 which faces toward bit 20.

A resistance element 65 is arranged in recess 35. Resistance element 65 can be rod-shaped and can be oriented along its longitudinal extent in the direction of the longitudinal extent of recess 35. It comprises a resistance material that is contacted oppositely using two contacts 65.1 proceeding along the longitudinal extent of resistance element 65. Contacts 65.1 are connected via connecting leads 63 to a measurement circuit 62. Resistance element 65 and measurement circuit 62 constitute sensor 61. Measurement circuit 62 is arranged in a recess inside bit holder 30. As a result of the cable-based connection between measurement circuit 62 and resistance element 65, however, it is conceivable to position measurement circuit 62 at any other position on bit holder 30. Measurement circuit 62 is connected by means of a further cable connection to an RFID transponder 60. RFID transponder 60 represents a contactlessly readable electronic component. RFID transponder 60 can preferably be arranged in a back-side access to bit receptacle 34. The back-side access allows introduction of a tool into bit receptacle 34 in order to deinstall bit 20. In the selected position, RFID transponder 60 is not, or not completely, surrounded by metal. This makes possible a radio connection to an associated reading device (not depicted). RFID transponder 60 can also be arranged at any other point on bit holder 30. It is advantageous to select in this context a position that is protected from wear and is not, or not completely, surrounded by metal and thus is not electromagnetically shielded. For that purpose the RFID transponder can be, for example, adhesively bonded, encapsulated, or magnetically fastened on the bit holder.

As described earlier, bit holder 30 wears away predominantly from that end face of its holding portion 32 which faces toward bit 20 and toward wear disk 50. Wear region 70 that is to be monitored is therefore located in the front region of holding portion 32 and is identified by a double arrow. A wear direction 71 along which wear region 70 is monitored proceeds from that end face of holding portion 32 which faces toward wear disk 50, in accordance with the center axis of bit receptacle 34. It is identified by an arrow. The end face of holding portion 32 constitutes a wearing surface 72. A wear limit 74 proceeding transversely to the center axis of bit receptacle 34 constitutes the termination of wear region 70 that is to be monitored.

During a milling operation, holding portion 32 becomes worn off starting from its side facing toward bit 20. As a result, the position of wearing surface 72 shifts toward wear limit 74. As wear proceeds, resistance element 65 also becomes worn away starting from its end facing toward bit 20. The result is that the electrical resistance of resistance element 65, measured between the two contacts 65.1, increases. The electrical resistance of resistance element 65 changes as a function of the remaining wear length, constituting a magnitude between wear limit 74 that constitutes a reference point and wearing surface 72. The change in resistance occurs continuously as wear proceeds. The electrical resistance is measured using measurement circuit 62 of sensor 61. The measured data thereby obtained are transferred to the contactlessly readable electronic component (RFID transponder 60) and temporarily stored there. They can be read out therefrom by a reading device (not depicted) arranged outside tool system 80 on milling machine 10. Alternatively, the electrical resistance can also be measured upon readout of the RFID transponder.

Particularly preferably, provision can be made that the reading device is arranged on a tool (not depicted) for installing and/or deinstalling bit 20. The reading device can be arranged, for example, on a drift punch of the tool which is guided, during deinstallation of the bit, through the back-side access to bit shank 26 of bit 20 which is held in bit receptacle 34. Upon a replacement of bit 20, the contactlessly readable electronic component (RFID transponder 60) arranged on bit holder 30 can be read out with the aid of the reading device. The measured data of sensor 61 are transferred in that context to the reading device arranged on the tool. The remaining wear length of bit holder 30, or a magnitude correlating with the wear length, can thereby be detected and evaluated during bit replacement. A determination of the wear state of the associated bit holder 30 thus occurs at each bit replacement. A decision can then be made as to whether bit holder 30 will continue to be used, or will be replaced. It is conceivable to display the remaining wear length directly by way of the tool, for example by way of a display arranged thereon or an optical or acoustic signal. It is also conceivable to transfer the data of the reading device to a further evaluation unit, for example to a computer or a machine control system of the milling machine, and to evaluate and/or display them there.

Figure 7:
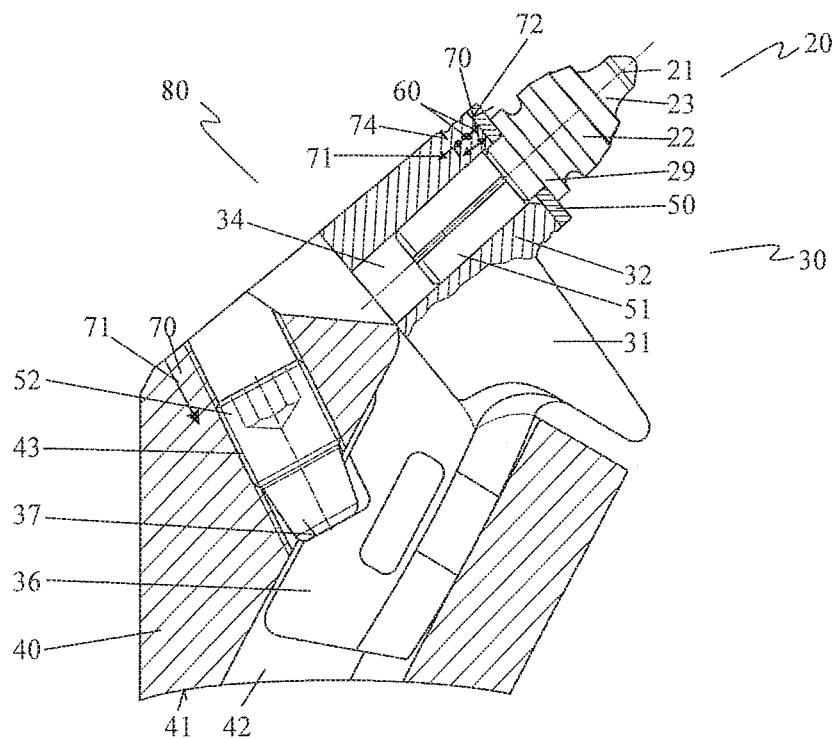
FIG. 7 shows the tool system shown in FIG. 3, with schematically depicted contactlessly readable electronic components arranged in a wear region.

In order to evaluate the wear state of base carrier 40, it is also possible to provide for base carrier 40 a sensor 61 (not depicted) having a resistance element 65 and a measurement circuit 62, as described for bit holder 30. Here as well, resistance element 65 constitutes measurement portion 64 of sensor 61. It can be arranged (as depicted in FIG. 7), along a wear direction 71 identified by way of example by an arrow, in a wear region 70 of base carrier 40 which is to be monitored.

It is also conceivable to arrange, on the side panels depicted in FIG. 1, sensors 61 whose measurement portions 64 are guided along a predefined wear direction 71 into wear regions 70, to be monitored, of the wear components arranged detachably on side panels 18. The measured data of sensor 61 can be transferred to contactlessly readable components, for example RFID transponders 60, and read out. The wear state of side panels 18 can thereby be monitored.

Figure 4:
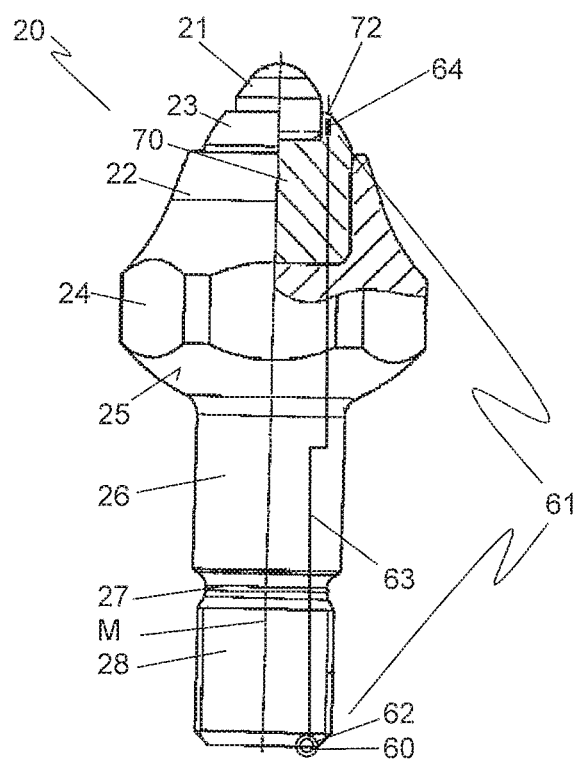
FIG. 4 is a partly sectioned depiction of a bit having schematically depicted resistors arranged in a wear region of the bit.

FIG. 4 is a partly sectioned depiction of a bit 20 having schematically depicted resistors 66 (depicted in FIG. 5) arranged in a wear region of bit 20. The front termination of bit 20 is constituted by bit tip 21, which is preferably made from a hard material, in the exemplifying embodiment shown from polycrystalline diamond (PCD). Bit tip 21 is held in a recess of connecting part 23, which in turn is secured in a recess shaped into bit head 22. Connecting part 23 is made from a hard material, in the present instance from metal carbide. Bit head 22 is made of steel. Bit tip 21, connecting part 23, and bit 22 form a surface, oriented obliquely with respect to a longitudinal center axis M of bit 20 and tapering toward bit tip 21, along which the milled material removed with bit 20 slides. Bit head 22 forms on its outer circumference a tool receptacle 24 that transitions, via a supporting surface 25 embodied with a slight convexity, into a bit shank 26 of bit 20. Bit shank 26 is embodied cylindrically. It has at the end a thread 28 that is separated by an undercut 27 from that region of bit shank 26 which is not equipped with a thread. Bit 20 can be inserted with its bit shank 26 into a corresponding receptacle of a bit holder 30, as shown by way of example in FIG. 2, and held therein by way of a threaded connection to its thread 28. It then abuts with its supporting surface 25 against a correspondingly shaped counterpart surface of bit holder 30. A tool can be placed onto tool receptacle 24 in order to make and undo the screw connection.

It is not only bits 20 shown in FIGS. 3 and 4 that can be utilized in the context of the invention. The invention is instead also applicable to all other types of bits having a holding portion and a working portion.

During operation, bit 20 is guided, with its bit tip 21 toward the front, through a substrate that is to be removed. Bit 21, connecting part 23, and bit head 22 are in particular exposed in that context to severe mechanical stress. Because it is very hard, bit tip 21 that is produced from polycrystalline diamond exhibits only comparatively little abrasion. The outer surfaces of connecting part 23 and of bit head 22, conversely, are more severely worn away. If connecting part 23, for example, becomes so severely worn that the recess in which bit tip 21 is held becomes exposed, bit tip 21 can become lost. Bit 20 is then worn out and can no longer be reused.

A measurement portion 64 of a sensor 61 is arranged in that region of connecting part 23 which is at the front in a working direction. Measurement portion 64 is electrically connected via supply leads to measurement circuit 62 of sensor 61. Measurement circuit 62 is integrated into an RFID transponder 60, constituting a contactlessly readable electronic component, which is arranged at that end of bit shank 26 which faces away from bit head 22.

Figure 5:
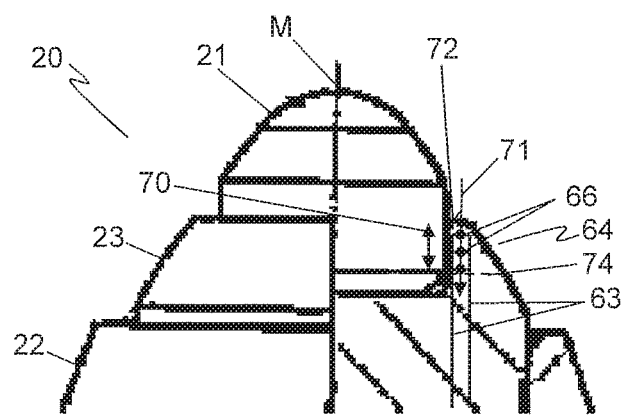
FIG. 5 shows a portion of the bit depicted in FIG. 4.

FIG. 5 shows a portion of bit 20 shown in FIG. 4, in the region of bit tip 21. Bit tip 20 becomes worn down starting from its outer surface. That surface of connecting element 23 which is arranged peripherally with respect to bit tip 21 is therefore also worn away during milling operation. That surface thus represents a wearing surface 72 of bit 20, as has already been described with respect to FIG. 3 for bit holder 30 depicted therein. Abrasion causes wearing surface 72 to come closer to wear limit 74, identified by a dashed line, of bit 20. Once connecting element 23 has been worn off sufficiently that wearing surface 72 reaches wear limit 74, a high risk then exists that bit tip 21 will become lost and bit 20 will become unusable. Bit 20 should now be replaced. The remaining material thickness between wear limit 74 and wearing surface 72 constitutes a wear length and a measure of the wear state of bit 20.

According to the present invention, electrical resistors 66 are arranged inside connecting part 23 along a wear direction 71 identified by an arrow. Resistors 66 are distributed, along wear direction 71 identified by an arrow, over wear region 70 which is to be monitored and which extends from wearing surface 72 to wear limit 74. They are wired in parallel with one another and connected via connecting leads 63 to measurement circuit 62 integrated into RFID transponder 60, as shown in FIG. 4. Measurement circuit 62 makes it possible to determine the total resistance of resistors 66 that are wired in parallel. Resistors 66 and measurement circuit 62 together constitute a sensor 61. Resistors 66 that are wired in parallel constitute measurement portion 64 of sensor 61. RFID transponder 60 represents a contactlessly readable electronic component. It is electrically connected internally to measurement circuit 62 of sensor 61 in order to exchange measured data.

As a result of wear on bit 20 along the monitored wear direction 71, resistors 66 arranged inside wear region 70 also become worn away in the order in which they are arranged along wear direction 71. This results in a change in the resistance, determined by measurement circuit 62 of sensor 61, of resistors 66 that are wired in parallel. The erosion of resistors 66 is identified by measurement circuit 62 on the basis of the measured resistance. The position of resistors 66 within wear region 70 and along wear direction 71 is known. On the basis of the measured resistance it is therefore possible to infer a wear length, constituting a magnitude between wear limit 74 that constitutes a reference point and the present location of wearing surface 72.

In the exemplifying embodiment shown, resistors 66 are arranged equidistantly from one another. A detected change in the measured resistance therefore identifies a decrease in wear length 70 by an amount equal to the spacing between two resistors. Wear length 70 is determined discontinuously, the resolution with which wear lengths 70 are ascertained being defined by the spacing between two resistors 66. In the exemplifying embodiment shown, three successive resistors 66 are provided. It is also possible, however, for only two resistors 66 or more than three resistors 66 to be arranged along wear direction 71. The resolution with which the remaining wear length can be determined can thereby be adapted to particular requirements.

Wear length 70 can be derived directly from the measured resistance. This requires a correspondingly calibrated measurement circuit 62 that makes possible a sufficiently accurate measurement of the resistance. Each measured value has associated with it a number of remaining resistors 66. Because resistors 66 are worn away along wear direction 71 and thus in a predefined sequence, a knowledge of the number of remaining resistors 66 and of the position of the individual resistors 66 allows a determination of the wear length as a magnitude between the selected reference point, in the present case wear limit 74, and the outermost resistor 66 that has not yet been worn away.

It is also conceivable to determine the wear lengths by determining and evaluating the number of resistance changes that has occurred. The measured resistance rises with each resistor 66 that is worn away. From the number of detected resistance changes it is thus possible to infer the number of resistors 66 worn away, and thus the number of resistors 66 that remain. Because resistors 66 are worn away in their sequence along wear direction 71, the remaining wear lengths can be inferred if the number and position of the worn-away and remaining resistors 66 is known.

The preceding statements that refer to the use and arrangement of resistors 66 and relate to a bit 20 are also intended to apply, in the context of the disclosure of this patent Application, in conjunction with bit holders 30 described above.

It is furthermore conceivable to arrange resistors 66 with different spacings from one another along wear direction 71. It is thereby possible, for example, to provide larger spacings for long wear lengths, and smaller spacings for short wear lengths, between resistors 66. With such an arrangement, the accuracy in terms of determining the wear lengths increases before wear limit 74 is reached, and thus before an immediately upcoming required replacement of bit 20, while less accuracy in determining the wear lengths is permitted for a comparatively uncritical wear state of bit 20, with a long wear length. Advantageously, the outer region of bit 20 or of bit holder 30 which is external in the unused state is less weakened because fewer resistors 66 are provided there, so that the life expectancy of bit 20 or bit holder 30 is enhanced.

Wear direction 71 does not need to proceed in the direction of longitudinal center axis M of bit 20, or of the longitudinal axis of the bit receptacle of bit holder 30. In principle, any suitable direction is conceivable. In particular, it is also conceivable to define wear direction 71 obliquely to longitudinal center axis M of bit 20 or to the longitudinal axis of the bit receptacle of bit holder 30, orthogonally to longitudinal center axis M or to the longitudinal axis, or on a curved path. Resistors 66 are then arranged along the oblique or curved orientation of wear direction 71. With such an arrangement of resistors 66 along wear direction 71 that proceeds in oblique or curved fashion, the wear length is measured between the reference point, in particular wear limit 74, and wearing surface 72.

In the exemplifying embodiments shown, measurement circuit 62 of sensor 61 is integrated into RFID transponder 60. The connection between measurement circuit 62 and resistors 66 of measurement portion 64 is effected via connecting leads 63. Connecting leads 63 are guided to resistors 66 through orifices through bit shank 26 and bit head 22, or through bit holder 30. It is also conceivable to adhesively attach connecting leads 63 in regions protected from wear, for example on the bit surface or on a corresponding surface of bit holder 30. Resistors 66 can be positioned inside one or several recesses in connecting part 23 or in bit holder 30. RFID transponder 60 is arranged at that end of bit shank 26 which is located opposite bit head 22. It is then located in a region protected from wear. RFID transponder 60 is positioned on the surface of bit shank 26 (or on a surface of bit holder 30). It can thus be read out by a suitable reading device with little interference and over longer distances.

In the exemplifying embodiments shown, a passive RFID transponder 60 is used. The latter is supplied with energy via the electromagnetic field emitted for that purpose from the reading device. Advantageously, that energy is also used to carry out the resistance measurement. In this instance, RFID transponder 60 and sensor 61 do not need their own energy source. They can thus be stored or used for a long time with no discharge of an energy source that is required.

It is also conceivable to use an active RFID transponder 60, which possesses a built-in battery and a memory for storing data. Advantageously, measurement circuit 62 of sensor 61 is likewise supplied with energy via the battery of RFID transponder 60. A measurement of the resistance of resistors 66 that are wired in parallel can thus be accomplished at any point in time. In order to minimize the energy consumption of sensor 61, the measurement is preferably accomplished at predefined time intervals.

The measurement signal that is ascertained by sensor 61, and is dependent on the resistance value of resistors 66 wired in parallel, is digitized and temporarily stored as measured data in the memory of RFID transponder 60. From there it can be read out using a suitable reading device. A current signal, constituting a magnitude that correlates with the resistance of the remaining resistors 66 that are wired in parallel and thus with the wear length, can be stored as measured data. Provision can also be made to calculate a resistance value from the measured signal, transfer it as measured data from sensor 61 to RFID transponder 60, and store it in digitized fashion in the memory thereof. It is likewise possible to ascertain the wear length from the measured signal of sensor 61 and store it as measured data.

Based on the ascertained wear lengths, a machine operator can decide whether bit 20 and/or bit holder 30 has a sufficiently long remaining service life for an upcoming milling task, and whether a required milling quality can be achieved with bit 20 and/or bit holder 30. It is also conceivable to automatically create and display to the machine operator, in consideration of the ascertained wear lengths, a prognosis for an expected remaining service life of bit 20 and/or of bit holder 30 in consideration of further operating data, for example material properties of a substrate that is to be worked. The operator can then decide whether bit 20 and/or bit holder 30 is to be replaced or to be re-used. The machine operator can also specify, on the basis of the ascertained wear lengths of various wear components, for example various bits 20 and/or different bit holders, a suitable point in time for maintenance at which several wear components are then replaced simultaneously. Maintenance work on different wear components can thus be coordinated, and stoppage times of milling machine 10 can thereby be minimized. Wear components can be used until their wear limit is reached, and the demand for spare parts can be minimized. As compared with merely monitoring the fact that wear limit 72 has been reached, ascertaining the wear length enables predictive scheduling of maintenance work. Unexpected stoppage times can thereby be avoided, and high milling quality can at the same time be maintained.

Figure 6:
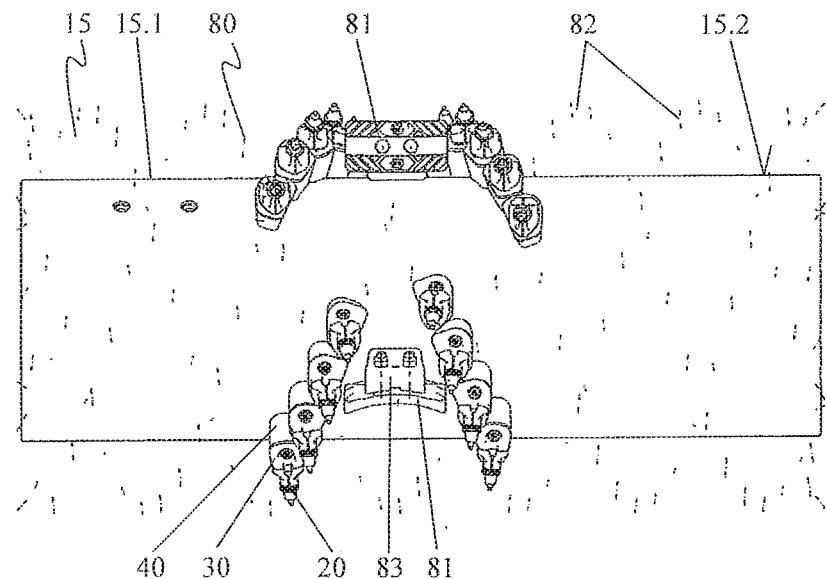
FIG. 6 shows a milling drum having ejectors.

FIG. 6 shows a milling drum 15 having an ejector 81. A plurality of base carriers 40 of tool systems 80 are welded onto drum surface 15.2. Base carriers 40 carry replaceable bit holders 30, each of which holds a bit 20. Base carriers 40 are associated with one another in such a way that they form a helix, namely a transport helix 82. For better clarity, only the inner tool systems 80 are shown, while the remaining course of transport helix 82 is identified by dashes. The dashes identify longitudinal center axis M of bits 20 that are not depicted. Transport helix 82 runs around drum surface 15.2, starting from the side of milling drum 15, toward the milling tube center constituted between the two sides.

Transport helices 82 meet in pairs in the region of the milling tube center. As is evident from FIG. 6, at least one respective ejector unit, having a carrying part 83 and an ejector 81 fastened thereon, is arranged there. Ejector 81 serves to eject the milled material, removed by bits 20, onto a transport belt (not shown). The milled material is transported for that purpose by transport helix 82 to the ejector unit having ejector 81.

During tool utilization, it is predominantly the radially external region of ejector 81 which experiences wear. Once its wear limit 74 (not shown here) is reached, ejector 81 must be replaced. A sensor 61 having an associated contactlessly readable electronic component (RFID transponder 60) can also be arranged on ejector 81, as described analogously for the wear components shown in FIGS. 3 to 6. This sensor allows a determination of the remaining wear length, from which a remaining service life of ejector 81 can then be derived.

Sensors 61 described with reference to FIGS. 3 to 5 make it possible to determine wear length 74 on wear components of a milling machine 10 as a magnitude between a wearing surface 72 and a reference point, in particular a wear limit. Determining wear length 74 has the advantage, as compared with a simple determination that a wear limit 74 has been reached, that the progression of wear on a wear component can be determined. This makes possible predictions, for example, regarding an expected further wear profile or regarding maintenance that needs to be provided, or an achievable milling quality that can be achieved with the wear component in the wear state that has been ascertained. Machine parameters of milling machine 10, for example an advance speed, a rotation speed of milling drum 15, or a milling depth, can also be established or limited as a function of the wear length or lengths that are ascertained, so that good milling quality can be achieved with high milling output and little energy consumption. Maintenance operations on the various wear components can be coordinated with one another. Additional stoppage times of milling machine 10, which might occur in the event of an unexpected need to replace a wear component, can thereby be avoided. Correctly timed replacement of wear component results in a high level of achievable milling quality, simultaneously with high milling output and low operating costs.

The above-described sensors 61, having the above-described measurement portions 64, can be used for the various wear parts of milling machine 10. For example, it is possible to provide, in wear region 70 of bit holder 30, resistors 66 that are wired in parallel and arranged along wear direction 71. Resistance elements 65 that measure continuously can correspondingly be provided for bits. It is also conceivable to use different sensors 61 that have different measurement portions 64 and allow a determination of the wear length, and to transfer their measured data by means of a contactlessly readable electronic component. For example, inductive, capacitive, or optical sensors 61 can be used. With optical sensors 61, for example, one or several optical waveguides, in particular a glass fiber or a bundle of glass fibers, can be guided in wear region 70 along wear direction 71. It then becomes worn away together with the wear component that is to be monitored. The result is to shorten an optical path within the optical waveguide, and this can be determined instrumentally, for example by way of a transit-time measurement or interferometrically.

Utilization of the invention is not limited to those wear components, and wear regions 70 to be monitored, which are shown. It can instead be provided on any wear components of the milling machine. For example, different types of bits, bit holders, and base carriers can be monitored in terms of their wear behavior using sensors 61. Several wear regions 70 in a wear component can also be monitored.

FIG. 7 shows tool system 80 shown in FIG. 3 with schematically depicted contactlessly readable electronic components arranged in a wear region 70, in accordance with an independent inventive idea.

The configuration of tool system 80 corresponds to that of FIG. 3, to the description of which reference is made. Contactlessly readable electronic components in the form of RFID transponders 60 are arranged along wear direction 71. RFID transponders 60 each have a unique identifier that can be read out by a reading device (not depicted) arranged on milling machine 10 or on a tool for installing or deinstalling bit 20. During use, holding portion 32 of bit holder 30 in particular experiences wear, starting from its surface. In that context, wearing surface 72 that is arranged along wear direction 71 shifts in wear direction 71 toward wear limit 74. As holding portion 32 wears down, RFID transponders 60 become exposed and worn away in the sequence in which they are arranged along wear direction 71. The identifier of an RFID transponder 60 destroyed in that manner can no longer be detected by the reading device. Based on the position of the outermost of RFID transponders 60 facing toward wearing surface 72 whose identifier is still detectable, it is possible to infer the remaining wear length as a distance between wearing surface 72 and a reference point that preferably constitutes wear limit 74 of bit holder 30. A discontinuous determination of the wear length of holding portion 32 is thus effected. As described above, this can be used in order to schedule maintenance work.

The independent inventive idea accordingly provides that two or several contactlessly readable electronic components are arranged, successively and spaced apart from one another along the at least one wear direction 71 that is to be monitored, in the wear region 70 or along the wear region 70. A respective unique and contactlessly readable identifier is associated with the contactlessly readable electronic component or components. Provision can preferably be made that the contactlessly readable electronic components that are arranged in the wear region 70 or along the wear region 70, and are successively and spaced apart from one another in the at least one wear direction 71 that is to be monitored, each have associated with them a position uniquely determinable by the identifier; and that a reading device or a control unit is embodied to determine the wear length proceeding from the reference point to the position of a last component in the direction of the ongoing wear whose identifier is no longer readable, or to the position of a first component in the direction of the ongoing wear whose identifier is readable, or to a region delimited between the last component in the direction of the ongoing wear whose identifier is no longer readable and the first component in the direction of the ongoing wear whose identifier is readable.

Advantageously, no further sensors 61 are needed for the determination, described with reference to FIG. 7, of the wear length as a measure of the wear state of the respective wear component.

What is claimed is:

1. A wear component of a milling machine, comprising:
a contactlessly readable electronic component;
at least one sensor connected to the contactlessly readable electronic component for the transfer of data;
wherein the contactlessly readable electronic component is configured to receive measured data of the at least one sensor and furnish said measured data for contactless reading, wherein said measured data corresponds to a current amount of wear of the wear component; and
a measurement portion of the at least one sensor is guided, along at least one wear direction to be monitored, into or along a wear region of the wear component.

2. The wear component of claim 1, wherein abrasion of the measurement portion results in a continuous or discontinuous change in a measurement signal of the at least one sensor.

3. The wear component of claim 1, wherein the sensor or a measurement circuit of the sensor is:
an integral constituent of the contactlessly readable electronic component; or
electrically connected to the contactlessly readable electronic component via a detachable plug connection; or
connected to the contactlessly readable electronic component via a fixed electrical connection; or
connected to the contactlessly readable electronic component via a radio connection.

4. The wear component of claim 1, wherein the contactlessly readable electronic component comprises an RFID transponder.

5. The wear component of claim 4, wherein the RFID transponder is a passive RFID transponder, an active RFID transponder, or a semi-active RFID transponder.

6. The wear component of claim 1, wherein the sensor is supplied with energy by a battery of the contactlessly readable electronic component, or via energy of an electromagnetic field used to read out the contactlessly readable electronic component.

7. The wear component of claim 1, wherein the measurement portion of the sensor comprises two or more electrical resistors, connected in parallel with one another and arranged with a spacing from one another along the wear direction that is to be monitored.

8. The wear component of claim 1, wherein:
the measurement portion of the sensor comprises a resistance element; and
a resistance of the resistance element changes as a result of abrasion of the resistance element.

9. The wear component of claim 1, wherein:
the measurement portion of the sensor comprises a capacitive sensing element or an inductive sensing element; and a capacitance of the capacitive sensing element or an inductance of the inductive sensing element changes as a result of abrasion of the sensing element.

10. The wear component of claim 1, wherein at least portions of the measurement portion of the sensor comprise at least a portion of the wear region of the wear component.

11. The wear component of claim 10, wherein the measurement signal of the sensor comprises:
an electrical resistance of the wear component or of a portion of the wear component; or
a capacitance measured between an electrode and the wear component or a portion of the wear component; or
an inductance of a coil in whose magnetic field the wear component or a portion of the wear component is guided.

12. The wear component of claim 1, wherein the wear component to be monitored comprises one or more of: a bit; a bit holder; a base carrier of a tool system; an ejector; and a wear runner of the milling machine.

13. The wear component of claim 1, wherein the contactlessly readable electronic component is arranged outside the wear region of the wear component.

14. The wear component of claim 13, wherein the contactlessly readable electrical component is arranged in a recess within the wear component which is protected from wear.

15. A milling machine comprising:
at least one wear component further comprising
a contactlessly readable electronic component,
at least one sensor connected to the contactlessly readable electronic component for the transfer of data,
wherein the contactlessly readable electronic component is configured to receive measured data of the sensor corresponding to a current amount of wear of the wear component, and
at least one measurement portion of the sensor is guided, along at least one wear direction to be monitored, into a wear region or along the wear region of the wear component;
wherein the milling machine has associated with it at least one reading device for contactlessly reading out at least the measured data of the sensor which are stored in the contactlessly readable electronic component.

16. The milling machine of claim 15, wherein the sensor or the contactlessly readable electronic component or the reading device or a controller connected to the reading device is configured to determine, as a measure of the wear on the wear component, a wear length measured along the wear direction to be monitored between a wear limit of the wear component and a wearing surface of the wear component.

17. The milling machine of claim 16, wherein the contactlessly readable electronic component or the reading device or the control unit is configured to determine the wear length as a function of the measured data of the at least one sensor.

18. The milling machine of claim 15, wherein the reading device is an RFID reading device.

19. A method for determining the wear on a wear component of a milling machine, the wear component comprising a contactlessly readable electronic component, wherein data of the contactlessly readable electronic component is contactlessly readable by a reading device, the method comprising:
ascertaining and contactlessly reading out a wear length of the wear component along a wear direction to be monitored, the wear length comprising a distance between a wear limit of the wear component and a wearing surface of the wear component, or a magnitude correlating with the wear length; and
determining the wear on the wear component based on the read-out data.

20. The method of claim 19, wherein a measurement portion of the sensor is also worn away as wear on the wear component proceeds, such that a measurement signal of the sensor changes;
wherein the wear length is determined from the measurement signal, or the measurement signal comprises the magnitude correlating with the wear length.

21. The method of claim 19, wherein the sensor is supplied with energy via a primary battery or via a rechargeable battery or via an electromagnetic field used to read out the contactlessly readable component.

22. The method of claim 19, further comprising displaying via a display unit one or more of:
the respective wear lengths of one or more wear components;
as a function of the respective wear lengths of one or more wear components, suitable machine parameters for operating the milling machine;
as a function of the respective wear lengths of one or more wear components, milling tasks executable using the milling machine without replacement of the one or more wear components, or the quality achievable upon execution of various milling tasks without replacement of the one or more wear components.

23. The method of claim 19, wherein a mutual exchange of the wear components is displayed, depending on the ascertained wear length of identical wear components used at different positions on the milling machine.

24. The method of claim 19, wherein:
the reading device is arranged on a tool configured for installation or deinstallation of a bit; and
the wear length, or the magnitude correlating with the wear length, is read out contactlessly by the reading device upon replacement of a bit.

* * * * *